US011897681B2

(12) United States Patent
Wolf et al.

(10) Patent No.: US 11,897,681 B2
(45) Date of Patent: *Feb. 13, 2024

(54) SEPARATING LAYER FOR THE TRANSPORT OF PHARMACEUTICAL SECONDARY PACKAGINGS

(71) Applicant: SCHOTT Schweiz AG, St. Gallen (CH)

(72) Inventors: Patrick Wolf, St. Gallen (CH); Elisa Wiesner, Ludesch (AT); Arne Kloke, St. Gallen (CH)

(73) Assignee: SCHOTT PHARMA SCHWEIZ AG, St. Gallen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,852

(22) Filed: Jul. 11, 2022

(65) Prior Publication Data

US 2022/0340349 A1 Oct. 27, 2022

Related U.S. Application Data

(63) Continuation of application No. 17/145,483, filed on Jan. 11, 2021, now Pat. No. 11,505,389.

(30) Foreign Application Priority Data

Jan. 10, 2020 (EP) .................................... 20151303
Jan. 13, 2020 (EP) .................................... 20151443
Aug. 6, 2020 (EP) .................................... 20189762

(51) Int. Cl.
*B65D 77/26* (2006.01)
*A61J 1/16* (2023.01)
(Continued)

(52) U.S. Cl.
CPC ................ *B65D 77/26* (2013.01); *A61J 1/16* (2013.01); *B65D 77/06* (2013.01); *B65D 77/2024* (2013.01)

(58) Field of Classification Search
CPC .................... B65D 77/26; B65D 77/06; B65D 77/2024; A61J 1/16
(Continued)

(56) References Cited

U.S. PATENT DOCUMENTS 5,758,775 A 6/1998 Lowe
6,164,044 A * 12/2000 Porfano ................ A61M 5/344 53/489
(Continued)

FOREIGN PATENT DOCUMENTS

CN 2668532 1/2005
CN 103314433 9/2013
(Continued)

OTHER PUBLICATIONS

ASTM D880-92 (2015), Standard Test Method for Impact Testing for Shipping Containers and Systems.
(Continued)

*Primary Examiner* — Jacob K Ackun
(74) *Attorney, Agent, or Firm* — Ruggiero McAllister & McMahon LLC

(57) ABSTRACT

A separating layer for the transport of pharmaceutical secondary packagings and to a transport system for transporting pharmaceutical secondary packagings which comprises the separating layer are provided. The separating layer is a polymer layer having a planar section extending in an axial direction along a longitudinal axis and an elevation extending normal to the longitudinal axis. The separating layer has in the axial direction a normal spring force that is 0.2 to 5 N.

21 Claims, 3 Drawing Sheets

(51) Int. Cl.
*B65D 77/06* (2006.01)
*B65D 77/20* (2006.01)

(58) Field of Classification Search
USPC .................................................. 206/439, 364
See application file for complete search history.

(56) References Cited

U.S. PATENT DOCUMENTS

| | | | | |
|---|---|---|---|---|
| 10,507,280 | B2 | 12/2019 | Okihara | |
| 2004/0112947 | A1 | 6/2004 | Davidsson | |
| 2006/0283925 | A1 | 12/2006 | Specker | |
| 2008/0173563 | A1 | 7/2008 | Perot | |
| 2009/0288977 | A1 * | 11/2009 | Vanderbush | A61M 5/008 206/524.8 |
| 2012/0181215 | A1 | 7/2012 | Brooks | |
| 2013/0186793 | A1 * | 7/2013 | Gagnieux | A61M 5/002 206/364 |
| 2014/0190861 | A1 * | 7/2014 | Carrel | B01L 9/06 206/518 |
| 2014/0374414 | A1 * | 12/2014 | Lanier | B65D 25/107 220/23.6 |
| 2015/0183541 | A1 | 7/2015 | Deutschle | |
| 2015/0197387 | A1 * | 7/2015 | Yeager | B65D 21/0233 206/499 |
| 2016/0136049 | A1 | 5/2016 | Weinstein | |
| 2017/0224433 | A1 | 8/2017 | Doering | |
| 2018/0208377 | A1 * | 7/2018 | Kloke | A61J 7/0069 |
| 2020/0390967 | A1 * | 12/2020 | Mason | A61M 5/002 |

FOREIGN PATENT DOCUMENTS

| | | |
|---|---|---|
| CN | 107042932 | 8/2017 |
| CN | 207346247 | 5/2018 |
| EP | 2792614 | 5/2016 |
| EP | 3615106 | 3/2020 |
| FR | 2674510 | 10/1992 |
| WO | 2012143533 | 10/2012 |
| WO | 2018198028 | 11/2018 |

OTHER PUBLICATIONS

ASTM D4169-16 (2016), Standard Practice for Performance Testing of Shipping Containers and Systems.

* cited by examiner

SEPARATING LAYER FOR THE TRANSPORT OF PHARMACEUTICAL SECONDARY PACKAGINGS

CROSS REFERENCE TO RELATED APPLICATIONS

This application is a continuation of U.S. application Ser. No. filed 17/145,483 filed Jan. 11, 2021, which claims benefit under 35 USC § 119 of European Application EP20151303.3 filed Jan. 10, 2020, European Application EP20151443.7 filed on Jan. 13, 2020, and European Application EP20189762.6 filed on Aug. 6, 2020, the entire contents of all of which are incorporated herein by reference.

BACKGROUND

1. Field of the Invention

Described herein is a separating layer for the transport of pharmaceutical secondary packagings and a transport system for transporting pharmaceutical secondary packagings.

2. Description of Related Art

In pharmaceutical plants, medicines are packaged from larger containers into small containers, so-called pharmaceutical primary packagings, for distribution to the customer. Examples of such pharmaceutical primary packagings include vials, carpules, ampules and syringes. This is usually carried out in that uncleaned pharmaceutical primary packagings from production are received by a format-specific machine, cleaned and sterilized, and subsequently filled and sealed. In order to simplify and especially to improve the flexibility of this complex process for the pharmaceutical industry, pre-cleaned and sterile pharmaceutical primary packagings are now being offered in tubs or trays, so-called pharmaceutical secondary packagings. A tub contains a nest which holds the pharmaceutical primary packagings while the pharmaceutical primary packagings are inserted directly in a tray. The tubs and trays may be sealed with an ultrafine fibre nonwoven made of high-density polyethylene (HDPE) produced in a flash spinning process. The selectively permeable ultrafine fibre nonwoven makes it possible to sterilize the tub/tray interior with ethylene oxide or steam even in the sealed state while achieving a microbial barrier. The sealed tub or tray thus constitutes a sterile barrier system. These ready-to-use packaging systems may be directly unpacked, filled and resealed by the pharmaceutical company under controlled sterile conditions.

For transport to the sterilization plants and to the pharmaceutical plants, the ready-to-use packaging systems are stacked loosely in a transport box. One problem encountered in the case of these ready-to-use packaging systems is that even the smallest variations in the dimensions of the nest, tub or tray have the result that the delicate process is disrupted during filling or that sterility can no longer be guaranteed as a result of cracks, fractures or deformations. Furthermore, it can happen, due to cracks, fractures or deformations, that individual pharmaceutical primary packagings are no longer properly held or even that individual pharmaceutical primary packagings are broken. The consequence of this damage is that damaged packaging systems are unusable and must be sorted out, leading to an interruption in production.

A further problem that may occur during transport of the ready-to-use packaging systems is that during transport the pharmaceutical primary packagings are shaken back and forth in the nest or tray, thus abrading very small particles. Particles are generally a problem since they may potentially be injected into the patient upon application of the medicine or may also render medical instruments inoperable due to blocking of cannulas. It is therefore also necessary to sort out packaging systems having a high particle contamination.

These problems were extensively investigated and the inventors have found that, surprisingly, the majority of damage to, and particle formation in, the packaging systems is caused during transport from the site of production to the site of use and that these problems may be reduced by a special separating layer.

SUMMARY

It is thus an object of the present invention to provide a separating layer for the transport of pharmaceutical secondary packagings and a transport system for transporting pharmaceutical secondary packagings which overcome the above-described problems and which better protect the sterile barrier system consisting of the wall of the secondary packaging and the protective film (for example ultrafine fibre nonwoven), as well as the pharmaceutical primary packagings contained therein, during transport.

This object is achieved by a separating layer for the transport of pharmaceutical secondary packagings, wherein the separating layer comprises a polymer; and wherein the separating layer comprises an elevation and a planar section.

The object is likewise achieved by a transport system for transporting pharmaceutical secondary packagings comprising a transport box, comprising a separating layer described herein and two pharmaceutical secondary packagings.

During transport the pharmaceutical secondary packagings rest on the planar surfaces of the separating layer or are covered thereby. The planar sections interact with the elevations located between two pharmaceutical secondary packagings or between a pharmaceutical secondary packaging and a wall of the transport box, thus effecting a damping action which attenuates jolting movements occurring during transport. This makes it possible to reduce deformation and fracturing of the pharmaceutical secondary packagings, the nests and/or the pharmaceutical primary packagings. The separating layer further reduces the risk of particle formation. A transport system according to one embodiment of the invention is shown in FIG. 4.

In the present application all singular terms shall also include the plural and all plural terms shall also include the singular unless otherwise stated. For example, all limitations and preferred embodiments of a pharmaceutical primary/secondary packaging shall, in particular, also apply to a plurality of, for example, 2 or more pharmaceutical primary/secondary packagings. Furthermore all limitations and preferred embodiments of the separating layer shall also apply to the transport system and vice versa unless otherwise stated. Preferred embodiments of a transport system described herein likewise apply to all transport systems described herein unless otherwise stated.

Minor alterations to the separating layer and the transport system may be undertaken without departing from the scope of the invention.

SEPARATING LAYER

A separating layer according to the invention is a separating layer for the transport of pharmaceutical secondary packagings, wherein the separating layer comprises a polymer; and wherein the separating layer comprises an elevation and a planar section.

The separating layer for the transport of pharmaceutical secondary packagings comprises a polymer, preferably a thermoplastic, more preferably a polyolefin, more preferably polypropylene and/or polyethylene, more preferably the separating layer consists of polypropylene. The use of polypropylene and/or polyethylene has many advantages. The materials are robust yet lightweight, hygienic, free from harmful substances, resistant to chemicals, recyclable and the separating layers may optionally be reused. Furthermore, incineration of said materials produces only $CO_2$ and water. The separating layer preferably consists of a corrugated sheet, more preferably of a polypropylene corrugated sheet. These are particularly easy to bend and the corrugated structure further increases the damping action. The separating layer is preferably formed from one piece, for example from a polymer corrugated sheet, preferably from a polypropylene corrugated sheet. Separating layers having a fibrous surface, for example paper, are not suitable since these result in excessive particle abrasion.

The length, width and thickness of the separating layer is not particularly restricted. The length of the separating layer is preferably 500 mm to 2000 mm, more preferably 750 mm to 1500 mm, more preferably 800 mm to 1200 mm; and/or, more preferably and, the width of the separating layer is 100 mm to 400 mm, more preferably 150 mm to 300 mm, more preferably 200 mm to 250 mm; and/or, more preferably and, the thickness of the separating layer is 0.5 mm or more, more preferably 1.0 mm or more, more preferably 2.0 mm or more, more preferably 3.0 mm or more, more preferably 3.5 mm or more, more preferably 4.0 mm or more; and/or, more preferably and, 10.0 mm or less, more preferably 5.0 mm or less, more preferably 4.0 mm or less, more preferably 3.0 mm or less, more preferably 2.0 mm or less. The inventors have found that, surprisingly, the damping action of the separating layer is particularly effective at a thickness of 1.0 mm or more, preferably 2.0 mm or more, as demonstrated by sufficiently high spring forces. However, it was found that when the separating layer has a thickness of more than 4.0 mm, preferably 3.5 mm, the polymer, for example a corrugated sheet made of polymer, is more difficult to bend, thus impeding production. The separating layer therefore preferably has a thickness of 1.0 mm or more and 4.0 mm or less, preferably 2.0 mm or more and 3.5 mm or less.

When the separating layer is formed from one piece, it is particularly simple to produce and this also ensures that the elevations do not detach from the planar sections during transport. A separating layer made of one material, wherein the elevations and the planar sections are formed by folding, further simplifies simple handling, and complex construction or consecutive insertion of the individual elements is avoided. Furthermore the elevations of the separating layers cannot slip out of place during transport and the damping action can therefore be ensured even in the case of severe motion. In order to achieve the same effect the elevations are preferably securely connected to the planar sections. A further advantage is that the connection of a plurality of elevations by one or more planar sections improves the damping effect since the damping action of individual elevations is coupled together.

In order to reduce the problems described in the introduction, the separating layer comprises an elevation and a planar section. A planar section is herein to be understood as meaning the section upon which the pharmaceutical secondary packagings rest or by which said packagings are covered during transport. The planar section comprises substantially no elevations from the plane. Said section may be sheetlike or individual regions, for example a square centrally below the pharmaceutical secondary packagings, are cut out, which can reduce the weight, for example. Small recesses at the edge, that are intended to facilitate removal from the transport box, are likewise possible.

An elevation is herein to be understood as meaning an elevation projecting outwards from the plane of the planar section. The height of the elevation is freely choosable. Particularly good damping properties were surprisingly observed when the elevation extends between 10 mm and 200 mm, preferably 20 mm and 100 mm, more preferably 30 mm and 80 mm, more preferably 40 mm and 70 mm from the plane and/or, preferably and, is between 10 mm and 150 mm, preferably 15 mm and 100 mm, more preferably 20 mm and 80 mm, more preferably 25 mm and 50 mm long, measured from one planar section to a further planar section.

The separating layer preferably comprises one elevation and two planar sections, wherein the elevation is arranged between the two planar sections; or two elevations and one planar section, wherein the planar section is arranged between two elevations; more preferably the separating layer consists of n planar sections and n+1 elevations, wherein the planar sections are each arranged between two elevations and n is 2 to 7, preferably 3 to 5, more preferably 3.

In an alternative embodiment the separating layer consists of n+1 planar sections and n elevations, wherein the elevations are each arranged between two planar sections and n is 2 to 7, preferably 3 to 5, more preferably 3.

The elevation may have any desired shape. The elevation(s) may extend upwards and/or downwards with regard to the plane spanned by the planar section(s). Particularly good spring properties are obtained when the elevation is substantially triangular, trapezoidal, hemispherical, circular or rectangular, preferably triangular, trapezoidal or hemispherical, more preferably triangular, in cross section. These shapes are also particularly easy to produce. For example, an elevation which is substantially triangular in cross section may be produced by folding a planar layer three times and forming these folds such that an elevation results. An embodiment of the separating layer in which the separating layer is formed from one piece, as described hereinabove, and the elevation is substantially triangular, trapezoidal, hemispherical, circular or rectangular, preferably triangular, trapezoidal or hemispherical, more preferably triangular, in cross section, is particularly preferred since such a separating layer exhibits very good damping properties but is also very simple and cost-effective to produce.

Further preferred embodiments of the separating layer satisfy one or more of the following features: the grammage is 100 to 2000 g/m$^2$, preferably 200 to 1000 g/m$^2$, more preferably 300 to 700 g/m$^2$, more preferably 300 to 400 g/m$^2$; the melting point measured by differential scanning calorimetry (DSC) is 100° C. to 250° C., preferably 130° C. to 180° C., more preferably 160° C. to 170° C.; the separating layer consists of a corrugated sheet, preferably a twin wall sheet; and any combinations thereof.

Further preferred embodiments of the separating layer satisfy one or more of the following features: the separating layer remains dimensionally stable during a sterilization, preferably during a thermal sterilization, for example up to 60° C., or chemical sterilization, for example with ethylene oxide, or sterilization by irradiation, for example gamma radiation; in the longitudinal direction the separating layer has an axial spring force of 1 to 50 N, preferably of 1.5 to 40 N, more preferably of 2 to 35 N, more preferably of 20 to 30 N; in the longitudinal direction the separating layer has a normal spring force of 0.2 to 5 N, preferably of 0.3 to 4 N, more preferably of 0.4 to 3 N, more preferably of 0.5 to 2 N; and any combinations thereof.

TRANSPORT SYSTEM

A transport system according to the invention is a transport system for transporting pharmaceutical secondary packagings comprising a transport box, comprising a separating layer described herein and two pharmaceutical secondary packagings. This pharmaceutical secondary packaging generally comprises a nest and a plurality of pharmaceutical primary packagings.

The term “pharmaceutical primary packaging”, also container, herein comprises all pharmaceutical primary packagings capable of receiving pharmaceutical formulations. Pharmaceutical primary packagings are preferably vials, ampules, syringes, syringe bodies, cartridges, carpules, more preferably the pharmaceutical primary packagings are vials, syringes or carpules.

The term “nest” herein refers to an article for holding the pharmaceutical primary packagings. Thus all pharmaceutical primary packagings in a packaging system are in direct contact with the nest. The nest preferably comprises 10 to 200 pharmaceutical primary packagings, more preferably 16 to 160, more preferably 40 to 100, primary packagings. The length and width of the nest is freely choosable. The length and width of the nest is preferably between 10 to 50 cm, more preferably between 15 cm to 30 cm, and the thickness of the nest is preferably 0.4 to 2.0 mm, more preferably 0.8 to 1.5 mm, more preferably 0.8 to 1.2 mm. The nest preferably comprises polypropylene or polyethylene, more preferably polypropylene, more preferably the nest consists of polypropylene.

The term “pharmaceutical secondary packaging” is herein to be understood as meaning an article into which the nest comprising the pharmaceutical primary packagings may be inserted with as close a fit as possible and thus be further protected. The pharmaceutical primary packagings preferably have no direct contact with the pharmaceutical secondary packaging but rather are held only by the nest inserted into the pharmaceutical secondary packaging. The shape of the pharmaceutical secondary packagings is freely choosable. The pharmaceutical secondary packagings are preferably cylindrical, cuboidal and trapezoidal prism-shaped, also called trough-shaped. The pharmaceutical secondary packaging has an open side through which the nest and the pharmaceutical primary packagings therein may be removed. This opening may be sealed during transport, for example with a lid or a removable protective film, preferably protective film comprising polyethylene, more preferably protective film consisting of a permeable ultrafine fibre nonwoven made of polyethylene. In particular a removable protective film protects the contents of the pharmaceutical secondary packagings and can ensure a sterile environment in the interior of the pharmaceutical secondary packaging during transport. For simpler handling the pharmaceutical secondary packaging preferably has a circumferential edge. This edge can be very thin and is thus very vulnerable to deformation and fracturing. The difference between a tray and a tub is the presence of a nest. If a nest is not present the pharmaceutical primary packagings are standing in the tub. Even if some parameters and effects are herein described for tubs, they also apply for trays and vice versa.

In a preferred embodiment the pharmaceutical secondary packaging is trough-shaped, more preferably trough-shaped with an edge along the top face which extends along the plane of the top face; the pharmaceutical secondary packaging is sealed on the top face by a removable protective film, more preferably protective film comprising polyethylene, more preferably protective film consisting of a permeable ultrafine fibre nonwoven made of polyethylene; and the pharmaceutical secondary packaging comprises a nest for pharmaceutical primary packagings; wherein the nest comprises preferably 10 to 200, more preferably 20 to 160, more preferably 40 to 100, pharmaceutical primary packagings.

In a ready-to-use packaging system the pharmaceutical secondary packaging is preferably sheathed by a sealed bag. This ensures a sterile environment and the pharmaceutical secondary packaging is also protected from contaminants. Since the ready-to-use packaging systems are intended to be used at the filling site without sterilization thereof beforehand at the filling site, the pharmaceutical secondary packagings and their contents are preferably either first sterilized, for example with gamma rays or ethylene oxide, and then sheathed with a bag or first sealed with a bag and then sterilized, for example with gamma rays. Preferably, the pharmaceutical secondary packaging comprises polypropylene or polyethylene, more preferably polypropylene, more preferably the nest and the pharmaceutical secondary packaging comprise polypropylene or polyethylene, more preferably polypropylene, more preferably the nest and the pharmaceutical secondary packaging consist of polypropylene. The more bags enclose the pharmaceutical secondary packagings the better these are protected while also allowing staged unpacking which simplifies loading into a sterile environment.

The transport system preferably comprises 4 to 6 separating layers and/or, preferably and, 9 to 21 pharmaceutical secondary packagings, more preferably 12 to 16 pharmaceutical secondary packagings.

In a preferred embodiment one or more of the following features are satisfied: the separating layer comprises one elevation and two planar sections, wherein the elevation is arranged between the two planar sections; the separating layer is arranged such that the planar section of the separating layer and the bottom faces of the pharmaceutical secondary packagings respectively contact one another and the elevation of the separating layer projects inwards between the two pharmaceutical secondary packagings; the elevation of the separating layer is dimensioned such that the pharmaceutical secondary packagings are not in contact; and any combinations thereof.

Preferably, the planar section or sections of the separating layer contact the bottom face of a first pharmaceutical secondary packaging and the top face of a second pharmaceutical secondary packaging. This achieves a compact layer construction and the pharmaceutical secondary packagings have a very low freedom of movement, thus further reducing particle abrasion.

In a preferred embodiment one or more of the following features are satisfied: the pharmaceutical secondary packaging is trough-shaped, preferably trough-shaped with an edge along the top face which extends along the plane of the top face; the pharmaceutical secondary packaging is sealed on the top face by a removable protective film, preferably comprising polyethylene, more preferably protective film comprising a permeable ultrafine fibre nonwoven made of polyethylene; the pharmaceutical secondary packagings comprise a nest for pharmaceutical primary packagings;

wherein the nest preferably comprises 10 to 200 pharmaceutical primary packagings; and any combinations thereof.

In a preferred embodiment one or more of the following features are satisfied: the pharmaceutical secondary packaging is sheathed by a sealed bag, preferably two sealed bags; the interior of the pharmaceutical secondary packagings is sterile; the pharmaceutical secondary packaging has been sterilized using gamma rays, steam or ethylene oxide; and any combinations thereof.

In a preferred embodiment one or more of the following features are satisfied: the transport box is substantially (≥95 wt-%, preferably ≥99 wt-%) made of the same material as the separating layer; the ratio of the width of the separating layer to the internal width of the transport box is 0.8 to 1.5, preferably 0.9 to 1.3, more preferably 1.0 to 1.1; the ratio of the length of the separating layer to the internal length of the transport box is 1.1 to 2.0, preferably 1.2 to 1.9, more preferably 1.3 to 1.7; and any combinations thereof.

A particular challenge for a transport system are long transports during which large stresses may occur. If only very few incidences of damage occur, even at high stresses, this results in fewer impairments in production. It is therefore preferable that in the impact test according to "Incline Impact Test ASTM D880-92 (2015)", wherein the impact speed is 2.14 m/s (see below for detailed description), 50% or less, preferably 40% or less, more preferably 30% or less, more preferably 20% or less, more preferably 10% or less, more preferably 5% or less, of the pharmaceutical secondary packagings, nest and pharmaceutical primary packagings are damaged. Particularly when 10% or less, preferably 5% or less, are damaged, less production impairment is to be expected.

If the pharmaceutical primary packagings are filled with injection solutions a very low particle contamination must be ensured. If after running the transport simulation program ASTM D4169-16, DC12, not including program I, safety level I, (see below for detailed description) there are particularly few particles on the outside of a, i.e. each individual, pharmaceutical primary packaging, said packagings are particularly suitable for injection solutions (see below for method of measurement).

In a preferred embodiment the pharmaceutical secondary packagings therefore each comprise 10 to 200, preferably 25 to 200, pharmaceutical primary packagings, wherein after running the transport simulation program ASTM D4169-16, DC12, not including program I, safety level I, there are 6000 or less, preferably 5000 or less, more preferably 2500 or less, more preferably 1000 or less, more preferably 600 or less, more preferably 450 or less, more preferably 400 or less, more preferably 350 or less, more preferably 300 or less, more preferably 250 or less, more preferably 100 or less, more preferably 50 or less, more preferably 25 or less, more preferably 10 or less, more preferably zero, particles having a size of 15 μm to 25 μm, preferably 10 μm to 25 μm, preferably 10 μm to 50 μm, more preferably 10 μm to 100 μm, more preferably 10 μm or more, more preferably 1 μm or more, on the outside of a, i.e. each individual, pharmaceutical primary packaging. These particularly good values expressed by the abovementioned parameter are achievable with the special separating layer described herein and/or the special transport system described herein. When satisfying this parameter, the pharmaceutical primary packagings are particularly suitable for storage of injection solutions.

In a preferred embodiment the pharmaceutical secondary packagings therefore each comprise 10 to 200, preferably 25 to 200, pharmaceutical primary packagings, wherein after running the transport simulation program ASTM D4169-16, DC12, not including program I, safety level I, there are 6000 or less, preferably 5000 or less, more preferably 2500 or less, more preferably 1000 or less, more preferably 600 or less, more preferably 450 or less, more preferably 400 or less, more preferably 350 or less, more preferably 300 or less, more preferably 250 or less, more preferably 100 or less, more preferably 50 or less, more preferably 25 or less, more preferably 10 or less, more preferably zero, particles having a size of 15 μm to 25 μm, preferably 10 μm to 25 μm, preferably 10 μm to 50 μm, more preferably 10 μm to 100 μm, more preferably 10 μm or more, more preferably 1 μm or more, on the inside of a, i.e. each individual, pharmaceutical primary packaging. These particularly good values expressed by the abovementioned parameter are achievable with the special separating layer described herein and/or the special transport system described herein. When satisfying this parameter the pharmaceutical primary packagings are particularly suitable for storage of injection solutions.

A transport system according to the invention is a transport system for transporting pharmaceutical secondary packagings (6), preferably according to any of the preceding paragraphs, comprising a transport box (11), comprising: optionally a separating layer (7), preferably 2 to 10 separating layers (7), more preferably 4 to 6 separating layers (7), according to any of the preceding paragraphs; and two pharmaceutical secondary packagings (6), preferably 9 to 21 pharmaceutical secondary packagings (6), more preferably 12 to 16 pharmaceutical secondary packagings (6); wherein the pharmaceutical secondary packagings each comprise 10 to 200, preferably 25 to 200, pharmaceutical primary packagings, wherein after running the transport simulation program ASTM D4169-16, DC12, not including program I, safety level I, there are 6000 or less, preferably 5000 or less, more preferably 2500 or less, more preferably 1000 or less, more preferably 600 or less, more preferably 450 or less, more preferably 400 or less, more preferably 350 or less, more preferably 300 or less, more preferably 250 or less, more preferably 100 or less, more preferably 50 or less, more preferably 25 or less, more preferably 10 or less, more preferably zero, particles having a size of 15 μm to 25 μm, preferably 10 μm to 25 μm, preferably 10 μm to 50 μm, more preferably 10 μm to 100 μm, more preferably 10 μm or more, more preferably 1 μm or more, on the outside of a, i.e. each individual, pharmaceutical primary packaging. This makes the pharmaceutical primary packagings in the transport system particularly suitable for storage of injection solutions (see above).

A transport system for transporting pharmaceutical secondary packagings (6), preferably according to any of the preceding paragraphs, comprising a transport box (11), comprising: optionally a separating layer (7), preferably 2 to 10 separating layers (7), more preferably 4 to 6 separating layers (7), according to any of the preceding paragraphs; and two pharmaceutical secondary packagings (6), preferably 9 to 21 pharmaceutical secondary packagings (6), more preferably 12 to 16 pharmaceutical secondary packagings (6); wherein the pharmaceutical secondary packagings each comprise 10 to 200, preferably 25 to 200, pharmaceutical primary packagings, wherein after running the transport simulation program ASTM D4169-16, DC12, not including program I, safety level I, there are 6000 or less, preferably 5000 or less, more preferably 2500 or less, more preferably 1000 or less, more preferably 600 or less, more preferably 450 or less, more preferably 400 or less, more preferably 350 or less, more preferably 300 or less, more preferably 250 or less, more preferably 100 or less, more preferably 50 or less, more preferably 25 or less, more preferably 10 or less, more preferably zero, particles having a size of 15 μm to 25 μm, preferably 10 μm to 25 μm, preferably 10 μm to 50 μm, more preferably 10 μm to 100 μm, more preferably 10 μm or more, more preferably 1 μm or more, on the inside of a, i.e. each individual, pharmaceutical primary packaging. This makes the pharmaceutical primary packagings in the transport system particularly suitable for storage of injection solutions (see above).

A preferred embodiment of the transport system is one in which the openings in the pharmaceutical secondary packagings (for example tubs) preferably point downwards during transport.

BREIF DESCRIPTION OF THE DRAWINGS

DETAILED DESCRIPTION

Figure 1:
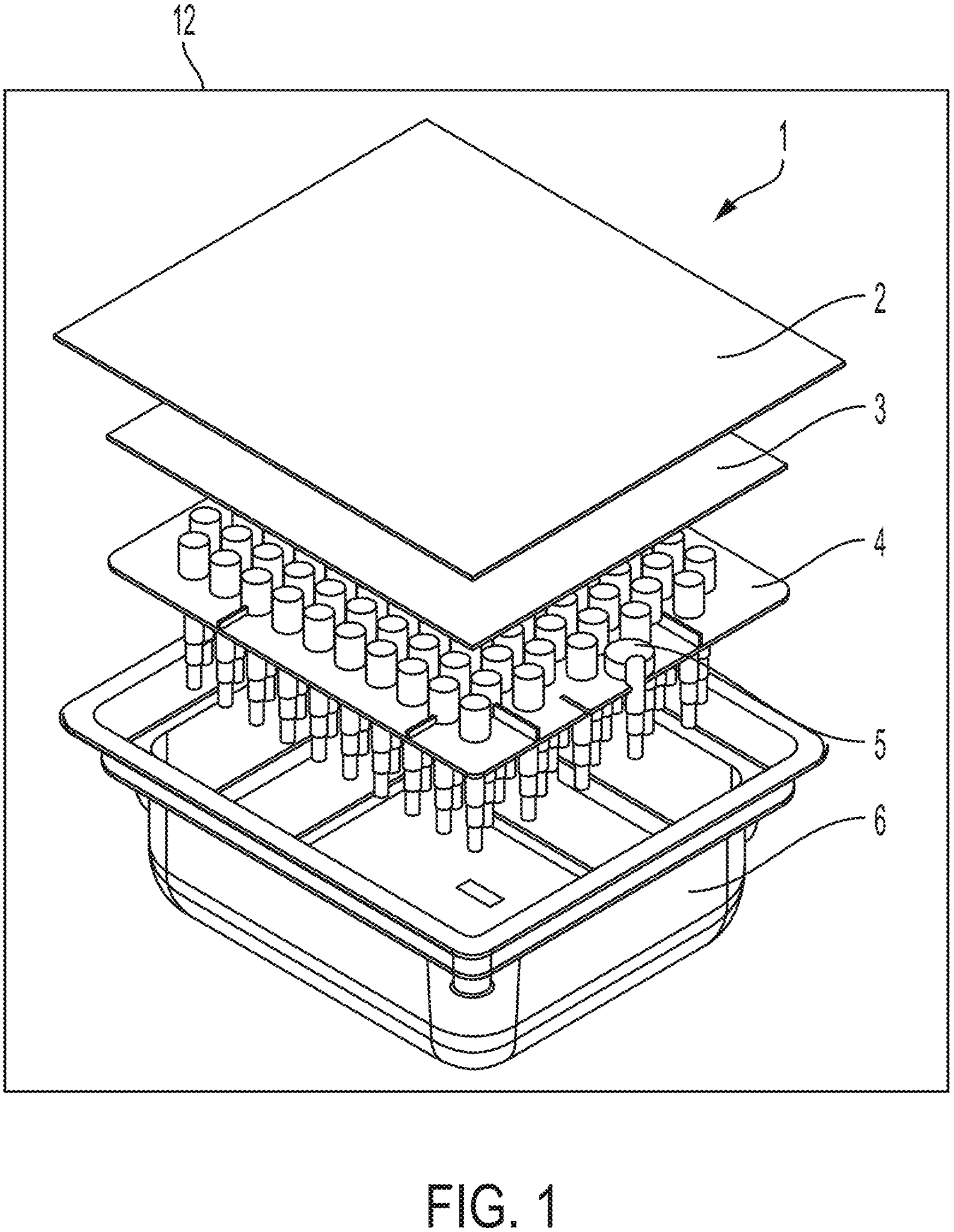
FIG. 1 shows a packaging system comprising tub, nest, syringes, cover sheet and protective film.

FIG. 1 shows an exploded view of a packaging system (1) used for transporting syringes (5). The packaging system (1) comprises a protective film (2), a cover sheet (3), a nest (4), syringes ((5), pharmaceutical primary packaging) and a tub ((6), pharmaceutical secondary packaging). The shape of the packaging system (1) is defined by the tub (6). The syringes (5) are held by the nest (4). The nest (4) is in turn inserted in the tub (6). The syringes (5) are not in direct contact with the tub (6). The syringes (5) are covered by the cover sheet (3) and the tub (6) is sealed with the protective film (2). The sealed tub (6) may additionally be enclosed with one or more bags (12).

Figure 2:
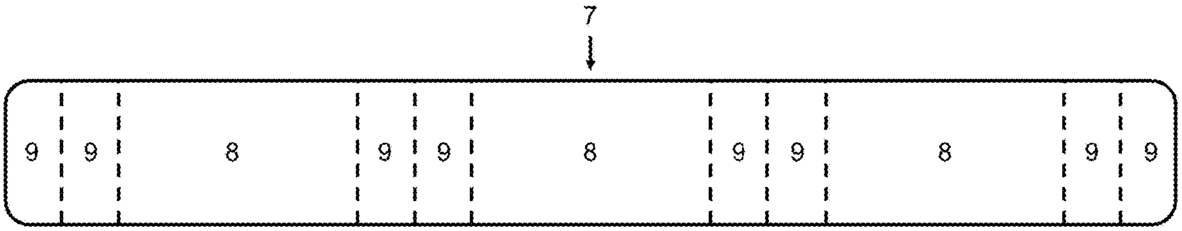
FIG. 2 is a plan view of a separating layer according to one embodiment of the invention.
Figure 3:
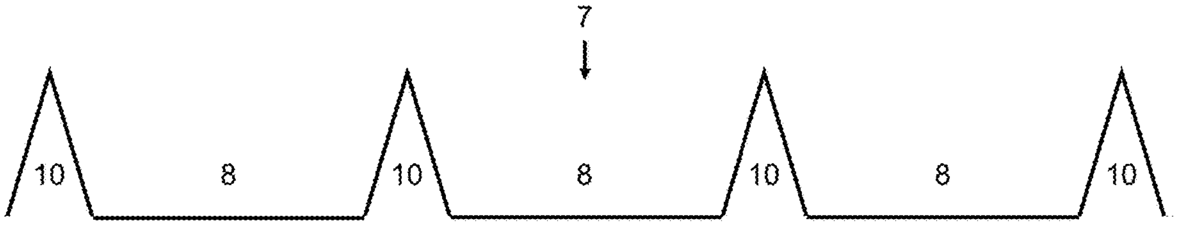
FIG. 3 is a cross section of a separating layer according to one embodiment of the invention.

FIG. 2 shows a plan view of a separating layer (7) according to one embodiment of the invention and FIG. 3 shows a cross section of a separating layer (7) according to one embodiment of the invention. As can be seen in FIGS. 2 and 3 the separating layer (7) is formed from one piece. The separating layer (7) consists of planar sections (8) and from the sections for forming the elevation (9) the elevations (10) are formed by folding the separating layer (7).

Figure 4:
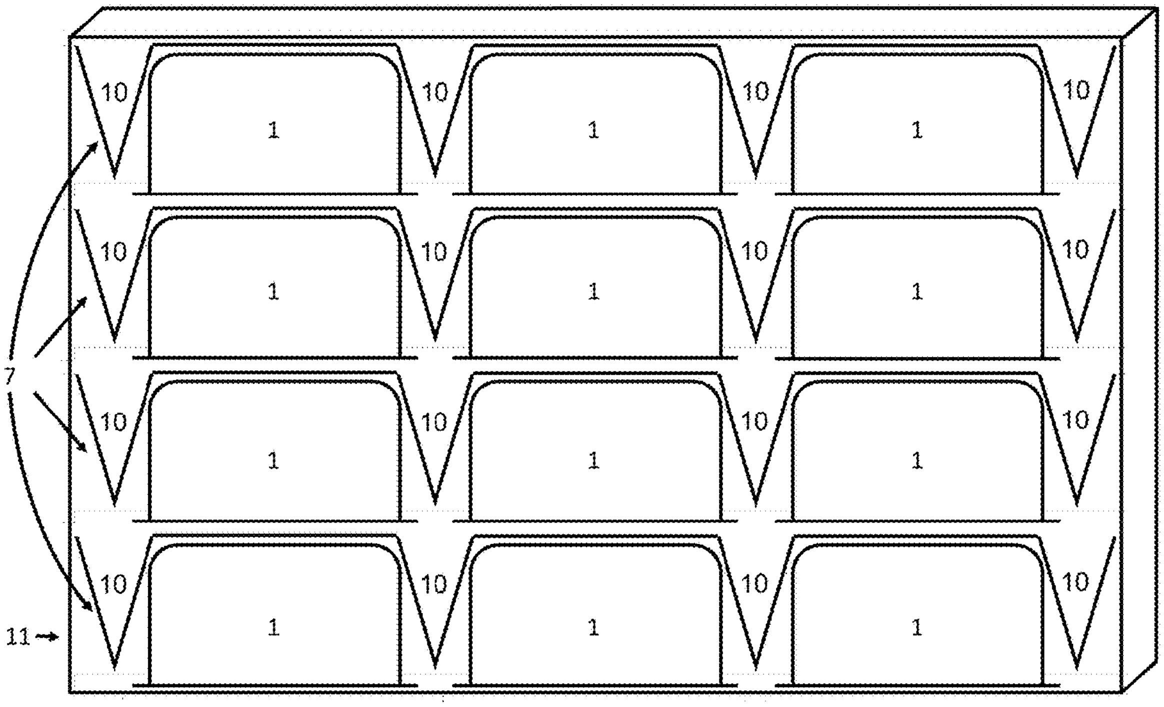
FIG. 4 is a cross section of a transport system according to one embodiment of the invention.

FIG. 4 shows the cross section of a transport system according to one embodiment of the invention. The transport box (11) contains four rows on top of one another, each comprising three packaging systems (1) side by side. The packaging systems (1) within a row and the respective rows are each separated by a separating layer (7). The packaging systems (1) within a row are not in contact with one another. In the case of a lateral impact the force is cushioned by the elevations (10) of the separating layers (7). It can be seen that in a preferred transport orientation the open side of the tubs points downwards and the elevations are likewise oriented downwards (see FIG. 4).

METHODS OF MEASUREMENT

The axial spring force in the longitudinal direction is measured as follows.

A separating layer has a piece comprising an elevation and two planar sections each having a length of 60 mm, i.e. from the respective outer fold seam to the end of the piece, cut out of it. The sample is clamped into a universal testing machine (Test GmbH, model 106.2 kN) such that the clamping grips are each located centrally in the planar sections and spaced 20 mm apart from the elevation, i.e. from the respective outer fold seam. The clamping grips are then oriented so as to be spaced apart such that a gap of at least 3 cm is formed between the two planar sections, i.e. a spacing between the clamping grips of 14 cm is established. The clamping grips are screwed tight to just hold the material securely. Measurement is carried out in the vertical direction. During the actual measurement the upper clamping grip is moved downwards at a constant speed of 500 mm/min and the force required therefor is continuously measured. As soon as the two planar sections touch the measurement is terminated. This is indicated by the force increasing rapidly and finally exceeding a value of 25 N (=end point). The axial spring force in the longitudinal direction is the force measured at a gap of 26.5 mm between the two planar sections, i.e. the force measured 26.5 mm before the clamping grips have been moved together close enough for the value to exceed 25 N. The measurement is repeated 10 times with a new separating layer and an average is formed.

The normal spring force in the longitudinal direction is measured as follows.

In a transport system, for example a transport box made of Akylux®, a lowermost layer of pharmaceutical secondary packagings, for example adaptiQ®, syriQ® or cartriQ™ from SCHOTT AG, is inserted. Atop this lowermost layer comprising secondary packagings the separating layer is inserted, which is configured such that there is an elevation between each of the pharmaceutical secondary packagings, and optionally between the pharmaceutical secondary packagings and the wall of the transport box, and the planar sections are located above the pharmaceutical secondary packagings. The elevations project downwards into the gaps between the pharmaceutical secondary packagings. Since the separating layer folded immediately before the test is longer than the length of the transport box and/or since the folded or bent elevations project into the interspaces, the separating layer is tensioned. The force necessary to prevent the separating layer from relaxing from the tensioned state for 10 seconds, i.e. from curving upwards, is measured. To this end a weight is placed in the middle of the middle planar section (for an uneven number of planar sections) or in the middle of one of the middle sections (for an even number of planar sections) and pressed downwards. The position of the separating layer is marked on the wall of the transport box with a thin pencil. The weight is then released and the time is simultaneously stopped. After 10 seconds it is checked whether the separating layer bearing the weight has relaxed over the marking, i.e. has curved over the marking. The test is repeated with varying weights and the weight that is just sufficient for the separating layer not to rise above the marking within 10 seconds is determined (=normal spring force in longitudinal direction).

The transport simulation program that was run is ASTM D4169-16, DC12 (not including program I), safety level I.

The particle contamination on the outside of the primary packaging is measured as follows.

The primary packaging is removed from the secondary packaging under laminar flow. The pharmaceutical primary packagings are then sealed so that no test liquid can penetrate into the primary packaging. 10 carpules sealed at both ends with a stopper and having an outer surface area of 15.76 $cm^2$ (used for example 3), of sealed pharmaceutical primary packagings is placed in a beaker in 100 mL of test liquid. To detach the particles from the surface the solution is stirred at 300 to 350 rpm for 20 seconds using a magnetic stirrer. After 15 minutes, 5 ml of the solution are analysed with a liquid particle counter (Pacific Scientific HIAC Royco, Model 9703) and the particle contamination is determined against a background measurement of the test liquid. This method and instrument allow reliable determination of particles with a size of 0.5 μm or larger. Analysis of the test liquid present is carried out 5 times in total. The average of the obtained values and the external surface area and the number of pharmaceutical primary packagings is then used to calculate the number of particles per square centimetre (particle count/$cm^2$) on the external surface.

The particle contamination on the inside of the tub is measured as follows.

The protective film, protective layer and the nest comprising the pharmaceutical primary packagings are removed from the tub under laminar flow. The tub is then washed out on all sides with 100 mL of test liquid, swirled several times and subsequently transferred into a beaker. After 15 minutes, 5 ml of the solution are analysed with a liquid particle counter (Pacific Scientific HIAC Royco, Model 9703) and the particle contamination is determined against a background measurement of the test liquid. This method and instrument allow reliable determination of particles with a size of 0.5 μm or larger. Analysis of the test liquid present is carried out 5 times in total. The particle count was calculated based on the area of the inside (=internal wall) of the tub and the measured values.

The particle contamination on the inside of a pharmaceutical primary packaging is measured as follows.

The protective film, protective layer and the nest comprising the pharmaceutical primary packagings are removed from the tub under laminar flow. The inside of a pharmaceutical primary packaging is then rinsed out on all sides with test liquid by filling the pharmaceutical primary packaging with the fill amount of test liquid nominal for the pharmaceutical primary packaging, swirled several times and subsequently transferred into a beaker. If a pharmaceutical primary packaging has more than one opening this may be sealed with a particle-free film. After 15 minutes, 5 mL of the solution is analysed with a liquid particle counter (Pacific Scientific HIAC Royco, Model 9703) and the particle contamination is determined against a background measurement of the test liquid. If the primary packaging has a nominal volume smaller than the required amount for the test, the test liquids from a multiplicity of primary packagings from the same secondary packaging are combined as a pool. This method and instrument allow reliable determination of particles with a size of 0.5 μm or larger. Analysis of the test liquid present is carried out 5 times in total. The particle count was calculated based on the area of the inside (=internal wall) of the pharmaceutical primary packaging and the measured values.

The impact test employed herein is the "Incline Impact Test ASTM D880-92 (2015)" but at 1.2× loading, i.e. the impact speed is 2.14 m/s instead of 1.75 m/s as per the standard. Counted as damage is a fracture, kink and/or crack in the primary and/or secondary pharmaceutical packaging.

A kink is apparent when the test specimen is deformed and can no longer be returned to its starting shape, i.e. a kink, more particularly crazing, is visible. A crack is characterized by a localized separation of the material of small width but considerable length and depth. A fracture is a destruction of the molecular bond and thus the test specimen has a free surface (fracture surface).

EXAMPLES 1 and 2

A separating layer made of polypropylene (Akylux®) having a length of 108 cm and a width of 22 cm was folded to obtain 4 triangular elevations and 3 planar sections, wherein a side length of an elevation was 5.3 cm long and the planar sections were each 22 cm long. The thickness of the separating layer was 2.0 to 3.5 mm. The transport box (=transport system) had a length, width and height of 77*23*50.8 cm and was likewise made of polypropylene (Akylux®). The pharmaceutical primary packagings and secondary packagings employed were commercially available tubs (cartriQ™ from Schott AG) that had been welded into a film.

The normal spring force and the axial spring force were determined as described hereinabove:

| Example # | Thickness [mm] | Normal spring force [N] | Axial spring force [N] |
|---|---|---|---|
| 1 | 2.0 | 0.6 | 6.4 |
| 2 | 3.5 | 2.1 | 28.0 |

EXAMPLES 3 AND 4

Two transport boxes were provided; one having a planar separating layer without elevations (example 3) and one having a separating layer according to an embodiment of the invention (example 4). To this end two transport boxes (=transport system) having a length, width and height of 770*230*508 mm and made of polypropylene (Akylux®) each had a row of three commercially available tubs (cartriQ™ from Schott AG) that had been welded into a film placed inside them with the opening facing down. One transport box then had a planar Akylux® polymer insert, having dimensions of 758*220*3.5 mm and lacking elevations, placed inside it while the other transport box had a separating layer made of polypropylene (Akylux®), having a length of 108 cm and a width of 22 cm and folded in such a way that 4 triangular elevations and 3 planar sections resulted, placed inside it, wherein a side length of an elevation was 5.3 cm long and the planar sections were each 22 cm long. The thickness of the separating layer was 2.0 mm. Another layer of tubs and another layer of the respective separating layer were then placed in the box and the procedure was repeated until the box was full. Next, the transport simulation program ASTM D4169-16, DC12 (not including program I), safety level I was run and subsequently the particle count and the size on the external surface of the carpules (=pharmaceutical primary packagings) and the internal wall of the tub (=pharmaceutical secondary packagings) were determined as described hereinabove. The results are shown in FIG. 5 (particle count on the external wall of the pharmaceutical primary packagings) and FIG. 6 (particle count on the internal wall of the pharmaceutical secondary packagings), wherein the black bars represent the respective particle counts of example 3 and example 4 is represented by chequered bars.

| | Particle count per cm$^2$ on external wall of carpules | | | |
|---|---|---|---|---|
| Example # | ≥2 μm | ≥5 μm | ≥10 μm | ≥25 μm |
| 3 | 21.0 | 6.1 | 2.1 | 0.1 |
| 4 | 10.6 | 2.7 | 0.7 | 0.0 |

| | Particle count per cm$^2$ on internal wall of the tub | | | | |
|---|---|---|---|---|---|
| Example # | ≥2 μm | ≥5 μm | ≥10 μm | ≥15 μm | ≥25 μm |
| 3 | 41.0 | 16.5 | 3.6 | 1.0 | 0.0 |
| 4 | 33.6 | 13.9 | 3.1 | 0.9 | 0.0 |

Figure 5:
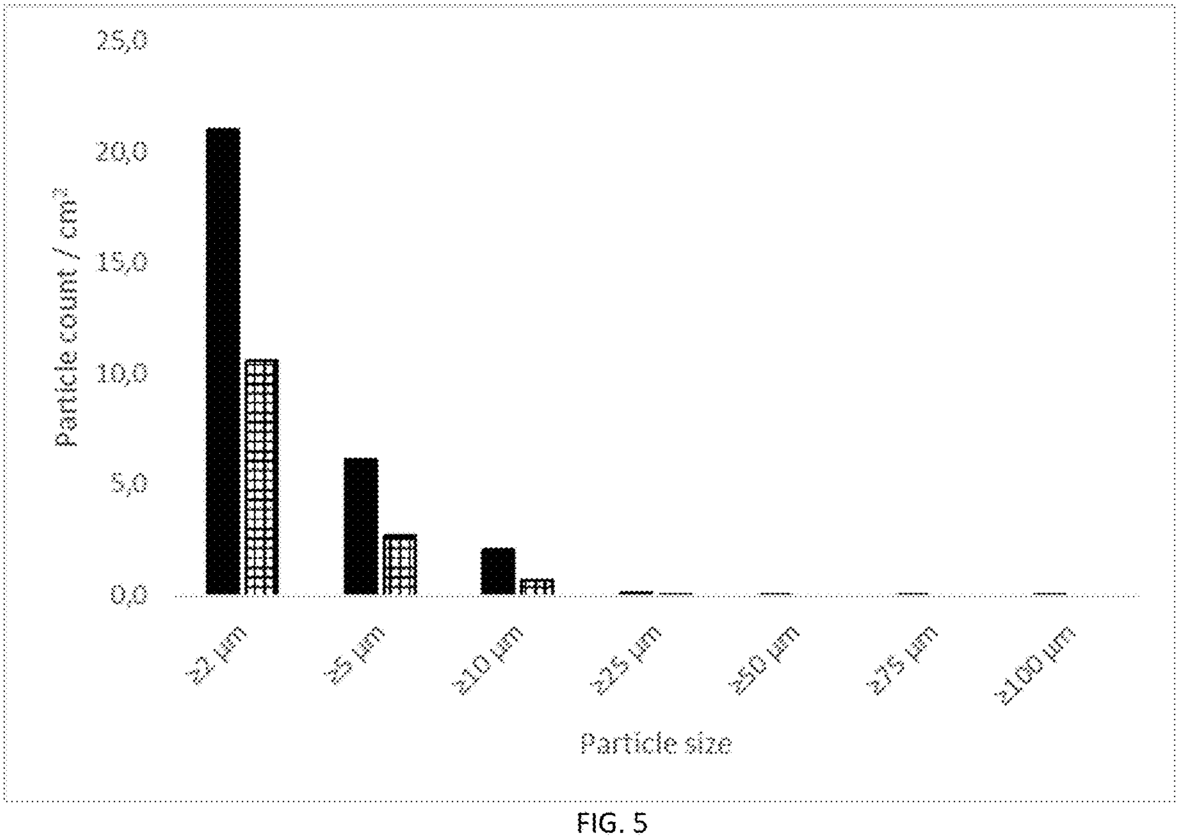
FIG. 5 shows a particle count per $cm^2$ on the external wall of the carpules.
Figure 6:
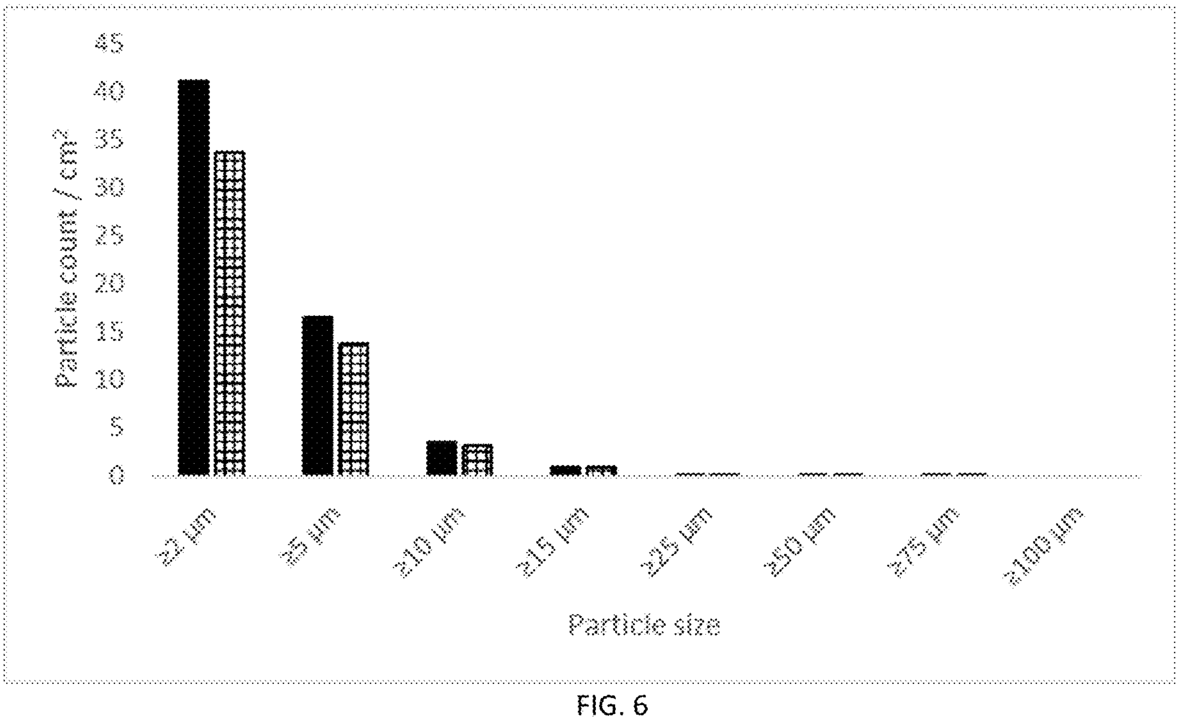
FIG. 6 shows a particle count per $cm^2$ on the internal wall of the tub.

It is apparent from the table and FIGS. 5 and 6 that through the use of a separating layer according to one embodiment of the invention the particle count on the external surface of the pharmaceutical primary packagings (=carpules) was reduced by more than half in all size ranges compared to a completely planar separating layer. The particle count on the internal wall of the pharmaceutical secondary packagings (=tubs) was likewise markedly reduced in all size ranges using a separating layer according to one embodiment of the invention compared to a completely planar separating layer. Both in example 3 and in example 4 particles larger than 25 μm were barely detectable (particle count<0.1).

In addition, transport boxes were packed as described hereinabove in examples 3 and 4 and impact tests as described hereinabove were performed. While 66% of the outermost pharmaceutical secondary packagings (=tubs) facing the side of impact were damaged in the transport box with the planar separating layers (example 3), only 2% of the outermost pharmaceutical secondary packagings (=tubs) facing the side of impact were damaged when using separating layers according to an embodiment of the invention.

LIST OF REFERENCE NUMERALS

1 Packaging system
2 Protective film
3 Protective layer
4 Nest
5 Syringe (pharmaceutical primary packaging)
6 Tub (pharmaceutical secondary packaging)
7 Separating layer
8 Planar section
9 Section for forming the elevation
10 Elevation
11 Transport box
12 One or more bags

What is claimed is:

1. A transport system for transporting pharmaceutical secondary packagings, comprising:

a transport box;

a separating layer; and two pharmaceutical secondary packagings in the transport box, the separating layer separating the two pharmaceutical secondary packagings from one another and from the transport box, wherein the two pharmaceutical secondary packagings comprise each 10 to 200 pharmaceutical primary packagings, wherein, after running a transport simulation program according to ASTM D4169-16, DC12, not including program I, safety level I, the pharmaceutical primary packagings have a condition selected from a group consisting of:

2.0 or less particles per cm$^2$ having a size of 2 μm to 25 μm on an outside and/or an inside of each of the pharmaceutical primary packagings;

6.0 or less particles per cm$^2$ having a size of 5 μm to 25 μm on the outside and/or the outside of each of the pharmaceutical primary packagings;

2.0 or less particles per cm$^2$ having a size of 10 μm to 25 μm on the outside and/or the inside of each of the pharmaceutical primary packagings;

less than 0.1 particles per cm$^2$ having a size of 25 μm or more on the outside and/or the inside of each of the pharmaceutical primary packagings; and any combinations thereof.

2. The transport system of claim 1, wherein the separating layer comprises a planar section, and wherein the separating layer is between the two pharmaceutical secondary packagings in the transport box.

3. The transport system of claim 2, wherein the separating layer comprises a polymer layer having a planar section extending in an axial direction along a longitudinal axis and an elevation extending normal to the longitudinal axis, the separating layer having a normal spring force that is 0.2 to 5 N.

4. The transport system of claim 3, wherein the separating layer further comprises a second planar section, wherein the elevation is arranged between the planar section and the second planar section.

5. The transport system of claim 4, wherein the separating layer is arranged such that the planar section and the second planar section are in contact with bottom faces of the two pharmaceutical secondary packagings, respectively, with the elevation projecting between the two pharmaceutical secondary packagings so that the two pharmaceutical secondary packagings are not in contact with one another.

6. The transport system of claim 3, wherein the planar section contacts a bottom face of a first of the two pharmaceutical secondary packagings and contacts a top face of a second of the two pharmaceutical secondary packagings.

7. The transport system of claim 3, wherein the normal spring force is 0.5 to 2 N.

8. The transport system of claim 3, wherein the separating layer has an axial spring force that is 1 to 50 N.

9. The transport system of claim 8, wherein the axial spring force is 20 to 30 N.

10. The transport system of claim 1, wherein the two pharmaceutical secondary packagings are trough-shaped with an edge along a top face which extends along a plane of the top face.

11. The transport system of claim 1, wherein the two pharmaceutical secondary packagings have a sterile interior.

12. The transport system of claim 1, wherein the transport box is made of the polymer of the separating layer.

13. The transport system of claim 1, wherein the separating layer has a width and the transport box has an internal width and the transport system further comprises a ratio of the width to the internal width of 0.8 to 1.5.

14. The transport system of claim 13, wherein the separating layer has a length and the transport box has an internal length and the transport system further comprises a ratio of the length to the internal length of 1.1 to 2.0.

15. The transport system of claim 1, wherein the separating layer has a length and the transport box has an internal length and the transport system further comprises a ratio of the length to the internal length of 1.1 to 2.0.

16. The transport system of claim 1, wherein the transport system, in an impact test according to the Incline Impact Test ASTM D880-92 (2015) with an impact speed of 2.14 m/s, exhibits damage to not more than 50% of the pharmaceutical primary packagings.

17. The transport system of claim 1, wherein, after running a transport simulation program according to ASTM D4169-16, DC12, not including program I, safety level I, the condition is selected from a group consisting of:

40.0 or less particles per $cm^2$ having a size of 2 μm to 25 μm on each individual internal wall of the pharmaceutical secondary packaging;

16.0 or less particles per $cm^2$ having a size of 5 μm to 25 μm on each individual internal wall of the pharmaceutical secondary packaging;

3.5 or less particles per $cm^2$ having a size of 10 μm to 25 μm on each individual internal wall of the pharmaceutical secondary packaging;

0.9 or less particles per $cm^2$ having a size of 15 μm to 25 μm on each individual internal wall of the pharmaceutical secondary packaging;

0.0 particles per $cm^2$ having a size of 25 μm or more on each individual internal wall of the pharmaceutical secondary packaging; and any combinations thereof.

18. The transport system of claim 1, wherein, after running a transport simulation program according to ASTM D4169-16, DC12, not including program I, safety level I, there are 6000 or less particles having a size of 15 μm to 25 μm on an outside or an inside of each individual pharmaceutical primary packaging.

19. The transport system of claim 1, wherein, after running a transport simulation program according to ASTM D4169-16, DC12, not including program I, safety level I, there are 50000 or less particles having a size of 2 μm to 25 μm on an outside or an inside of each individual pharmaceutical primary packaging.

20. A transport system for transporting pharmaceutical secondary packagings, comprising:

a transport box;

a separating layer; and two pharmaceutical secondary packagings in the transport box, the separating layer separating the two pharmaceutical secondary packagings from one another and from the transport box, wherein the two pharmaceutical secondary packagings comprise each 10 to 200 pharmaceutical primary packagings, wherein, after running a transport simulation program according to ASTM D4169-16, DC12, not including program I, safety level I, the pharmaceutical primary packagings have a condition selected from a group consisting of:

40.0 or less particles per $cm^2$ having a size of 2 μm to 25 μm on each individual internal wall of the pharmaceutical secondary packaging;

16.0 or less particles per $cm^2$ having a size of 5 μm to 25 μm on each individual internal wall of the pharmaceutical secondary packaging;

3.5 or less particles per $cm^2$ having a size of 10 μm to 25 μm on each individual internal wall of the pharmaceutical secondary packaging;

0.9 or less particles per $cm^2$ having a size of 15 μm to 25 μm on each individual internal wall of the pharmaceutical secondary packaging;

0.0 particles per $cm^2$ having a size of 25 μm or more on each individual internal wall of the pharmaceutical secondary packaging; and any combinations thereof.

21. A transport system for transporting pharmaceutical secondary packagings, comprising:

a transport box;

a separating layer; and two pharmaceutical secondary packagings in the transport box, the separating layer separating the two pharmaceutical secondary packagings from one another and from the transport box, wherein the two pharmaceutical secondary packagings comprise each 10 to 200 pharmaceutical primary packagings, wherein, after running a transport simulation program according to ASTM D4169-16, DC12, not including program I, safety level I, there are 6000 or less particles having a size of 15 μm to 25 μm on an outside or an inside of each individual pharmaceutical primary packaging.

* * * * *